Sept. 4, 1956 M. A. COLER 2,761,854
MANUFACTURE OF CONDUCTIVE PLASTICS
Filed May 6, 1952
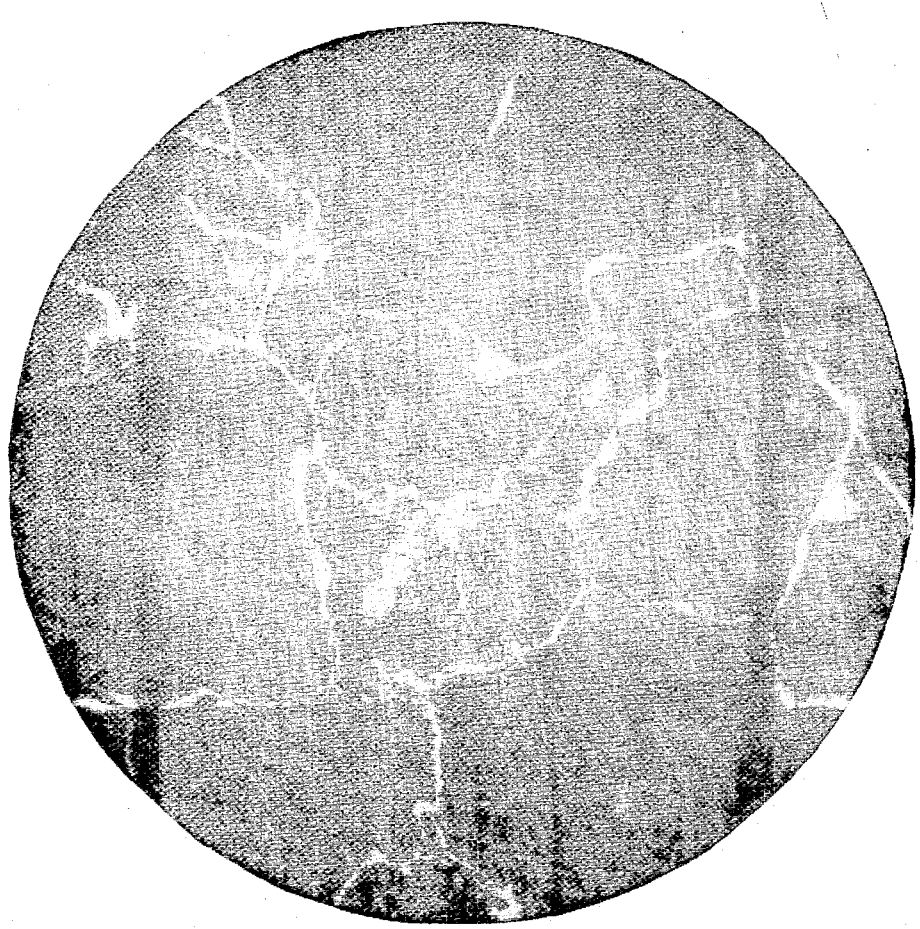
INVENTOR
Myron A. Coler
BY
Curtis, Morris + Safford
ATTORNEYS United States Patent Office 2,761,854
Patented Sept. 4, 1956

2,761,854

MANUFACTURE OF CONDUCTIVE PLASTICS

Myron A. Coler, New York, N. Y.

Application May 6, 1952, Serial No. 286,388

20 Claims. (Cl. 260—38)

This invention relates to electrically conductive plastic products, and more particularly to molded plastic articles having a reticulated metal structure extending in continuous phase through the body of the plastic and to molding powders for making such articles.

The term, plastic, as used herein embraces any one of a large and varied group of materials commonly referred to as plastics and resins and characterized as organic substances of large molecular weight.

Plastic or resin objects with good electrical conductivity are often desired. For instance, it may be desired to metallize plastic buttons by electrodeposition. Several procedures are known for rendering plastic bodies conductive. The method commonly used involves the deposition on the surface of the molded plastic object of a film of silver by chemical reduction as practiced in the manufacture of mirrors. After "mirroring," the plastic object is electrically conductive and may be plated with certain precautions. This method is cumbersome and expensive since each plastic article must be cleaned, sensitized and coated under controlled conditions which differ with the type of plastic involved and the configuration and size of the plastic article. With such surface coatings, since there is no conductivity through the plastic article, the distribution of the current is limited by the character of the conductive surface, hence, regions such as deep recesses in the molded article may be poorly coated and consequently will not be properly plated. Furthermore, in such coated articles, there is considerable danger of failure by peeling because of poor bonding and the marked difference in coefficients of thermal expansion of the metal coating and the underlying plastic. The adhesion is purely mechanical; attempts to improve the adhesion by roughening the surface are limited if a smooth final finish is desired, as is usually the case.

In many instances, the improvement of the thermal conductivity of plastic masses is highly desirable. In this connection it is well to note that heretofore it has not been feasible to cure large plastic objects with thick sections because of the tendency to overheat or damage the surfaces which are in contact with the mold before the inner portions of the objects are sufficiently heated. Dielectrically heated plastic preforms and the like have been resorted to in some such instances but this obviously involves an additional operation and attendant expenses.

An important object of my invention is to provide molded plastic articles having certain selected characteristics of metals.

A further object is to provide molded plastic articles having the appearance of metal articles without plating or otherwise metallizing the molded articles.

Another object is to produce molded plastic bodies of enhanced electrical and/or thermal conductivity.

These and other objects of the invention will be apparent in the description which follows:

In accordance with this invention, metals of appreciable electrical and/or thermal conductivity are deposited over a major proportion of the surface area of the particles of plastic molding powders so that objects molded therefrom exhibit good electrical and/or thermal conductivity. Such molded objects of good electrical conductivity can be electroplated without recourse to intermediate treatments, such as mirroring, applying conducting lacquer, etc. Moreover, since the conducting structure is distributed throughout the body of the plastic object in essentially continuous phase, the metal electrodeposit is in a sense rooted and not solely dependent on superficial adherence.

From an extended investigation of my invention, I have determined that the desired improvement of the thermal and/or electrical properties of plastic articles produced in accordance with the invention is generally assured by controlling simultaneously two factors, viz: the area factor $R_A$ and the volume factor $R_V$ which are defined as follows:

$$R_A = \frac{A_M}{A_P}$$

and $$R_V = \frac{V_M}{V_P + V_M}$$

where $A_P$ = area of plastic powder surface
$A_M$ = area of plastic powder surface clad with metal
$V_P$ = volume of plastic powder
$V_M$ = volume of coating metal Advantageously, $R_A$ should be in the range of about 0.55 to 1.00 while $R_V$ should be in the range of about $3 \times 10^{-6}$ to $6 \times 10^{-2}$. Preferably, $R_A$ should be made to fall in the range of about 0.90 to 1.00 and $R_V$ in the range of about $5 \times 10^{-4}$ to $3 \times 10^{-2}$. It is indeed surprising that such small volumes of metal relative to the volume of plastic materially improve the electrical and/or thermal conductivity of molded plastic objects. In general, the quantity of metal applied to the plastic particles is between about 1 and about 30%, preferably between about 5 and about 15%, based on the weight of the plastic particles.

The metallized or metal clad molding powders of my invention should not be confused with the familiar "metallics" and "metallic pearls." In these conventional products, metal particles varying from powders to small pieces of foil are simply incorporated or dispersed in the manner of pigments and fillers to give substantially isolated metal islands. Since the metal particles of these conventional molding powders are surrounded by plastic, the particles are effectively insulated and hence contribute negligibly to the electrical and thermal conductivity of objects molded therefrom.

The difference between the present molded products and the prior art products referred to above can be further brought out by referring to the accompanying drawing which shows a photomicrograph of an etched section through a typical molded product prepared by the present method. The magnification of the photomicrograph is 50×. It will be observed that the metal is present as a reticulated structure or network extending through the article. In other words both the metal and the plastic are in the form of a continuous phase extending throughout the article. Moreover it is apparent from the photomicrograph that the particles have been deformed during molding to a sufficient extent to eliminate all voids.

When an attempt is made to secure the enhanced conductivities and related properties of the molded products of my invention by increasing the metal loading of conventional metal bearing plastics, the results are in general completely unsatisfactory. Thus, in order to obtain reasonable electrical conductivity, there must be through contacts between a significant number of the embedded metal particles of the conventional materials; this requires minimum metal volume loadings of the order of 50 to 60% (i. e., Rv is about 0.5 to 0.6). Even at these high loadings the conductivity will not be as high as can be secured with one-tenth the amount or less of the same metal distributed through the same plastic according to the method of my invention. From the practical standpoint, it has not been possible to go to such high volume metal loadings without encountering structural weaknesses, like excessive friability and fabricating difficulties. Also, especially when the denser metals are required, such highly loaded plastics lack the desired low density of plastics.

The quantity and nature of the metal cladding on the particles are such that a material improvement of electrical and/or thermal conductivity of the plastic base is effected without destroying the moldability of the powder. Generally, the conductive coating on the particles assumes the form of imperfect envelopes, i. e., there are pinholes or minute bare spots where the resin particles have not been covered. It is still possible to retain the moldability of a powdered plastic even though the particles are encased in substantially perfect envelopes of metal, since under the molding pressure the thin envelopes may crack or shear and thus permit the plastic cores to ooze out and establish bonding contact with adjacent particles. Other theories might be advanced to explain the unexpected phenomenon that plastic particles or spherules coated with metal can still be successfully molded into desired products which exhibit a combination of selected characteristics of plastics and metals, despite the considerable deformation of the plastic particles that occurs during molding. Suffice it to say, however, that it is only necessary to follow the teachings of this invention; that optimum quantity of any given metal for any selected plastic to achieve a desired final result in terms of molded products is determinable by simple preliminary experiments.

The resin or plastic powder which may be treated by the process of this invention may be chosen from the large group of molding substances including thermosetting materials like phenolic and ureaformaldehyde plastics and thermoplastic materials like polystyrene, polyethylene, polymethyl methacrylate, vinyl copolymers, celluose acetate, etc. The plastic particles may already contain compounding ingredients such as lubricants, plasticizers, dyes, pigments and fillers like alphacellulose, wood flour and mica.

The coating of the plastic particles may be effected in any of several ways, e. g., by smearing, sputtering, vaporizing and condensing, or mirroring with a suitable metal. The coating of plastic particles by chemical methods such as the familiar reduction of alkaline silver solutions by the formaldehyde and Rochelle salt processes to form silver mirrors is particularly advantageous when the plastic particles are very finely divided and when a high degree of a real coverage at a minimum cost is desired. Very thin and well-distributed films can be applied by such techniques. Silver is especially useful when conductivity is of prime importance because of the superlative conductivity of the element and the compartively good conductivity of its ordinary corrosion products.

While any metal which contributes the desired conductivity to the comminuted plastic may be used, copper and silver are preferred in view of the fine electrical and thermal conductivities and the ease with which they may be applied to the plastic particles. Because in some cases it is possible to use very limited amounts of coating materials, it becomes practical to utilize such expensive metals as gold and platinum to achieve special effects. To secure further economies and also to minimize conversion of the metal to less conducting compounds by natural corrosion or the like, multiple metal coatings may be employed. Thus, gold may be deposited over iron and silver over copper.

Although as hereinbefore mentioned, there are several well-known procedures for coating finely divided solids and any desired procedure may be followed in preparing the conductive molding powders of this invention, I have found that the simple smear technique is to be preferred. By smear technique, I mean the method of applying directly to the surfaces of the plastic particles a metal in relatively finely divided form compared to the size of the particles to be coated. This may be achieved by tumbling the plastic particles with a metal powder under conditions which promote adhesion of the metal powder to the plastic particles. Adhesion promoting conditions include moderate heating where the plastic is thermoplastic, wetting the surfaces of the plastic particles with a suitable solvent to make them tacky, and rubbing and impacting action such as is secured by ball milling a mixture of plastic particles and metal powder. I find ballmilling not only effective but also advantageous where it is desired to produce plastic particles with a burnished metal coating. Articles having a genuinely metallic appearance can be molded from plastic particles with burnished metal coatings with little or no buffing or other treatment of the molded articles being required to develop the metallic appearance.

The preferred procedure for applying the metal powder to the plastic particles may be generally described as follows: A metal powder is selected wherein the particles are of a size materially smaller than the plastic particles. I have found that for best results the average diameter of the metal powder particles should be no greater than one-third the average diameter of the plastic particles. Moreover, I have found that the physical configuration of the metal powder particles is important. The preferred particles for use in the present process are of laminar form, e. g., flake or disk form. Where such laminar particles are used the techniques for making the plastic particles tacky as referred to above are in general unnecessary and hence the procedure becomes exceptionally simple.

The comminuted plastic and laminar metal powder particles are for example charged into a suitable rotatable container, such as a tumbler, in proper proportions and in an amount such that they occupy only a minor fraction, say 10 to 40% of the total volume of the container. The particular shape of the tumbler used does not appear to be critical, provided that it can be conveniently rotated about a horizontal axis to tumble the contents thereof. I have found a cylinder having a diameter approximately half its length to be satisfactory. The proper proportion of metal powder can be determined by calculation from the surface areas involved, or by experiment, or a quantity known to be somewhat in excess of that required can be used. For example, in all cases that I have investigated the metal powder required to cover completely the surfaces of the plastic particles is significantly less than 25% by weight of the plastic and accordingly if a mixture is prepared containing 20% by weight of metal powder it may ordinarily be assumed to contain an excess of the metal powder. It is evident that after one or two runs have been made with any particular resin and metal powder the precise amount of metal powder to give complete coverage of the plastic particles will be known, and it is preferable to use this amount since the subsequent screening operation can then be eliminated.

When the tumbler has been charged with the proper quantities of plastic and metal powders it is rotated to tumble and mix the contents thereof. It is important that adequate free space be provided in the tumbler to permit the desired tumbling and mixing to occur, and I have found that the quantity of mixture charged should desirably not exceed in volume 40% of the volume of the tumbler. The tumbler is rotated at a suitable speed, say 40 R. P. M., until the plastic particles have been coated with metal to the extent of at least 90% and desirably until they are substantially completely coated with metal. The extent of coating can be determined by removing a sample and inspecting it under the microscope. While a considerable amount of coating occurs in the first 10 to 15 minutes, it is usually not desirable to attempt to minimize the tumbling time and a tumbling period of 1 to 10 hours is preferred.

When the tumbling is complete the charge is removed and is then ready for molding in accordance with any of various procedures as indicated in the examples given below.

In order to point out further the nature of the present invention, the following specific examples are given of illustrative methods of producing the present molding powders and of preparing conductive plastic products therefrom:

*Example 1*

Alpha-cellulose filled urea-formaldehyde granules (American Cyanamid W–177 "Pearl" hard flow granules) were classified to secure a coarser than 40 mesh fraction. The granules were chiefly in the 10 to 40 mesh range and predominantly in the 30 to 40 mesh range. To 1000 parts by weight of these plastic granules there was added 250 parts by weight of gold-simulating bronze powder ("Gelb Gold" of Drakenfeld & Co., nominal 200 mesh) and the mixture was tumbled and milled for about 10 minutes. At the end of this time, another 140 parts by weight of gold-simulating bronze powder (U. S. Bronze Powder Works, Inc., nominal 325 mesh) was added to the mixture which had been tumbled and the tumbling operation was continued for another 15 minutes. The mixture was then classified on a 40 mesh screen to separate the excess of loose metal powder from the plastic particles which had become coated. The metal attached to the plastic particles amounted to 7.5%, based on the weight of the unclad plastic particles. Examination of the coated particles under a binocular microscope at a magnification of 45× showed that about 95% of the surface area of the particles was covered with metal. The calculated values of $R_A$ and $R_V$ were, respectively, 0.95 and $1.3 \times 10^{-2}$.

The metallized plastic granules had an antique gold appearance. Objects were made by compression molding these coated granules in a 50-ton Stokes press at full loading employing 4 cavities each having an area of approximately 7 sq. inches or at an average pressure of about 3600 lbs. per square inch. The die temperature was 310° F. Molding time was 1.5 minutes. The molded objects were physically strong and had an antique gold, hammer-tone appearance with small translucent islands distributed over the otherwise solid-metal-resembling surface. The molded objects possessed a specific electrical conductivity well over one million times that of objects molded from the same plastic without metal cladding of the granules.

*Example 2*

Polymethyl methacrylate molding powder (Fisher #12–252 Lucite spherules), the particles of which fell in the size range of 50 to 150 mesh with a predominance of about 80-mesh particles, was coated with 24-karat gold by thermal evaporation of the metal. The plastic particles were exposed in a chamber having a capacity of four cubic feet, to the vaporized metal at a pressure of about $5 \times 10^{-5}$ mm. for a period of about 3 minutes. The particles were double exposed. When viewed under a microscope at a magnification of 45×, the brilliantly gold-coated plastic particles were found to be covered with metal over about 60% of their surface area. The gold coating amounted to about 1.5% of the weight of the plastic. The average film thickness was estimated, by means of controls, to be of the order of 800 A. The values determined for $R_A$ and $R_V$, respectively, were 0.60 and $9.2 \times 10^{-4}$.

Test pieces were compression molded with these gold-coated particles. The charge was preheated in the die to a temperature of 310° F. and then pressed at 3000 lbs. per square inch for 15 minutes. The molded pieces which had a golden "stardust" appearance on a brown background responded to an electrical conductivity test in a standard acid copper plating bath.

*Example 3*

Polymethyl methacrylate molding powder (the same as that used in Example 2) was coated with copper by tumbling 1000 parts by weight of resin powder with 110 parts by weight of copper powder (polished flakes chiefly under 400-mesh size produced by Ohio Bronze Powder Co.). After tumbling the mixture for 12 minutes, unattached metal particles were separated from the metallized plastic particles by classification with a 200-mesh screen, the loose metal powder passing therethrough. The metal coating corresponded to about 10% of the weight of the plastic. At a magnification of 45×, the bright copper-clad plastic spherules appeared almost completely (98%) covered with metal. In this example, $R_A$ was 0.98 and $R_V$ was $1.3 \times 10^{-2}$.

Test pieces were compression molded in the manner described in Example 2. The appearance of the molded objects was that of massive metallic copper. In fact, a molded piece when laid side by side with a piece of copper was not readily distinguishable therefrom. The molded pieces showed enough conductivity to light a neon bulb when placed in an electrical circuit with the bulb. These molded pieces possessed a specific electrical conductivity well over one million times that of objects molded from the same plastic without metal cladding of the molding powder.

The metallized plastic powder was also used in injection molding tests employing a 1-oz. Watson-Stillman laboratory press. The powder was first preheated for 10 minutes in an oven at a temperature of 190° F. and then injected at a nominal temperature of 400° F. and a pressure of 1100 lbs. per square inch for a period of 10 seconds. The thus molded pieces were of attractive appearance having a reddish-coppery grained pattern with fine striae.

*Example 4*

Polymethyl methacrylate molding powder (the same as that used in Example 2) was screen classified to obtain a fraction, the particles of which were predominantly in the size range of 100 to 150 mesh. The resin powder was sensitized with a 0.1% aqueous solution of stannous chloride and 1000 parts by weight of the sensitized powder was added to a freshly prepared mixture consisting of 4000 parts by weight of 0.1 molar aqueous solution of silver nitrate and 1200 parts by weight of monoethanolamine. The resulting slurry was warmed to a temperature of 175° F. and maintained at that temperature for 15 minutes with continuous agitation. After cooling for one hour, the slurry was filtered and the coated plastic particles were washed on the filter with warm water and finally dried at a temperature of 190° F. The finished plastic powder had a dark gray appearance in mass but when examined under a microscope the individual particles were found to be substantially completely encased by a silvery-appearing coating. The cladding amounted to about 2.5% of the weight of the plastic. The average film thickness was estimated by means of controls and silver consumption to be of the order of 1000 A. The value of $R_A$ was 1.00, while that of $R_V$ was $2.9 \times 10^{-3}$.

Test pieces were compression molded by the method described in Example 2. The molded pieces were a dark gray resembling gun-metal with fine bright silvery specks.

Example 5

Clear cellulose acetate butyrate granules (Eastman—Tenite II) classified to within the size range of 6 to 20 mesh were coated with iron by mixing 1000 parts by weight of resin, 100 parts of carbonyl iron powder (General Aniline Works product) and 40 parts of benzene, and ball-milling the resulting slurry for one hour. The benzene was then removed and the dry powdered mixture was freed of loose metal particles by classification on a 100-mesh screen which permitted the unattached metal to pass through.

The iron-coated resin powder was given a displacement coating of copper by a 2-minute immersion in an acid copper plating bath. The metallized resin particles were recovered by filtration, were washed with water and then alcohol, and were dried. The finished powder had a clean, but slightly dull, coppery pink color. By microscopic examination, it was determined that about 85% of the surface area of the resin particles had been covered with metal. The values of $R_A$ and $R_V$ were, respectively 0.85 and $5.0 \times 10^{-3}$. The metal coating corresponded to about 3%, based on the weight of the resin particles.

Test pieces were compression molded with the metal-clad plastic granules of this example by the procedure described in Example 2, except that a temperature of 300° F. was employed and the molding period was only 10 minutes. The molded pieces had a decorative, predominantly copper-colored surface with markings corresponding to granule boundaries.

Example 6

A polystyrene-silver molding powder was prepared from polystyrene ground so as to pass an 80-mesh screen and be retained on a 140-mesh screen and flake silver having a maximum particle size of 25 microns and an average particle size of 2.5 microns. A 950 cc. bottle was charged with 100 grams of the polystyrene and 10 grams of the flake silver, then rotated about its principal axis at 40 R. P. M. for a period of 10 hours. At the end of this period substantially all of the silver was attached to the polystyrene and substantially all of the surface area of the polystyrene was covered with silver.

The powder thus produced was molded under 2000 p. s. i. pressure. The heating schedule was 20 minutes at 300° F. followed by cooling under pressure. The molded product had a specific resistance of less than 0.01 ohm centimeter.

Example 7

The procedure of Example 6 was followed except that 100 grams of polyvinyl chloride ground so as to pass through a 100-mesh screen and be retained on a 140-mesh screen was substituted for the polystyrene of Example 6.

The molded product had a specific resistance of about 0.01 ohm-centimeter.

Example 8

The procedure of Example 6 was followed except that 100 grams of a wood-filled, general purpose phenol-formaldehyde resin ground so as to pass a 20-mesh screen and be retained on a 40-mesh screen was substituted for the polystyrene of Example 6 and the amount of flake silver was reduced to 5 grams.

The molding powder thus produced was molded under 2000 p. s. i. pressure for 20 minutes at 350° F. and cooled under pressure. The molded product had a specific resistance of about 0.01. It was tested for tensile strength and found to have a strength about 30% greater than that of a corresponding molding made from the same resin with the same molding procedure, but containing no metal.

Example 9

The procedure of Example 6 was followed except that 100 grams of unfilled general purpose phenol-formaldehyde resin was substituted for the polystyrene and 10 grams of flaked alloy containing 70% copper and 30% nickel i. e. constantan, was substituted for the flake silver. The resin particles were sized as in Example 6. The alloy particles were all finer than 10 microns.

Molding conditions were as in Example 8 and the molded product had a specific resistance of about 0.5 ohm-centimeter. The molding had a temperature coefficient of resistance less than 0.00003 per degree centigrade.

Example 10

The procedure of Example 9 was followed except that an alloy containing 30% copper and 70% nickel i. e. Monel metal, was substituted for the alloy of Example 9. The molded product had a specific resistance of about 1 ohm centimeter.

Example 11

The procedure of Example 9 was followed except that an alloy containing 80% nickel and 20% chromium i. e. Nichrome, was substituted for the alloy of Example 9. The molded product had a specific resistivity of 0.5 ohm-centimeter.

It will be appreciated that molding powders treated in accordance with my invention may be advantageously utilized in compression, injection and extrusion molding operations. Because such molding powders may be made to have improved thermal conductivity, it is feasible to resort to higher molding temperatures, without fear of localized overheating, to mold larger objects in the same time, or to mold a given object in less time, than has been the practice heretofore. Furthermore, products molded from such treated powders also have superior thermal conductivity and, accordingly, may exhibit improved qualities in service, such as greater resistance to heat or flame damage. Also as indicated in Example 8 the molded products of the present invention may have a strength greater than that of the corresponding plastic containing no metal.

As brought out in Example 3, it is entirely feasible by this invention to mold plastic articles which have the appearance of metal articles and yet have the lightness and other desirable properties of plastics. Such products made up with precious metals like silver, gold and platinum are particularly well suited for jewelry manufacture. Not only is such jewelery less costly to produce because of the simple and high-speed operations that are involved, but also the precious metal content of this type of jewelry may be readily recovered in pure form without difficulty. In contrast, for example, gold-plated jewelry or jewelry made of 14-karat gold involve laborious operations if it is desired to recover the gold content free of other metals. Another interesting aspect of the invention is the production of jewelry from 24-karat gold which is generally not fashioned into jewelry without first being alloyed with hardening metals. The invention obviates degradation of the gold with base metals and yields products exhibiting the full beauty of pure gold.

Heretofore, many unsuccessful attempts have been made to produce plastic bearings, the lack of success being largely attributable to the localized building up of heat caused in turn by the characteristically low thermal conductivity of plastics. The conducting plastic products of this invention are superior for use as bearing materials in view of their relatively high thermal conductivities.

Plastic products molded from powdered plastics having relatively heavy coatings of metal may be sanded or buffed to yield finished products with pleasing surface effects. Thus, by sanding off a thin surface layer it is possible to expose the resin cores of the metallized resin particles adjacent the surface of the molded object and thereby to develop beautiful and unique patterns comprising tiny islands of plastic set in a metallic reticulation. Various other treatments of products molded from metal-coated plastic particles for obtaining decorative or other desired surface effects will suggest themselves to those skilled in the art. For instance, difficulties frequently encountered in securing satisfactory adhesion of organic finishes to conventional plastic objects may be largely overcome by molding such objects from metallized plastic powders in accordance with this invention, exposing the immediate underlying surface as by abrasion and etching the surface of the objects with respect to the plastic or metal, or both, in order to secure a micro-roughness. However, since the surface of molded objects made in accordance with this invention is substantially metal or a composite of metal and plastic, organic finishes may often be applied directly thereto with satisfactory results without preliminary etching. It is well to observe that the molded products of this invention may often be sanded or buffed with less tendency toward smearing or blocking and at higher finishing speeds than is practical with products formed from unmetallized plastic molding powders.

While plastic products of good electrical conductivity are well suited for electroplating, such products are of value in other fields. For instance, in sheet form such products may be employed as table tops and floor coverings in operating rooms or other places where dissipation of electrostatic charges is desired. The conductive plastic bodies of my invention are also useful in the electrical industry; for example, small resistors may be simply and economically molded from a powdered plastic having silver or other suitable conductor on the surfaces of the plastic particles. Thus, by way of example, I have prepared molded plastic units from silver-coated polymethyl methacrylate spherules with $R_V$ about 0.013 and $R_A$ about 0.95. The light silvery-gray product has an electrical conductivity at room temperature of about 5 mhos/cm. cube. This value is comparable with that of the semi-metal tellurium and approximately 10 times that of the best aqueous electrolytic conductors.

It is well to observe that where the plastic particles are clad with a ferromagnetic metal such as iron or nickel, objects molded therefrom will have improved magnetic permeability as well as electrical and/or thermal conductivity. The utility of plastic bodies with a high degree of magnetic permeability will be obvious to those skilled in the electrical arts.

Quite apart from desirable thermal and electrical properties, the simulated metal appearance of the molded products of my invention is of considerable interest and importance. In other words, in some cases I am combining selected optical properties of metals, such as the characteristic reflectivity, with other desirable characteristics of plastics, such as low density and non-scratching qualities compared with the harder metals (e. g., solid copper ash trays, unless smooth and provided with a felt or like base, can easily mar furniture finishes). The simulated metal of my invention has a density and hardness approximating that of the plastic employed. Attractive copper-like poker chips made in accordance with Example 3 illustrate the possibilities of metal-appearing products having certain physical properties of plastics.

The optical properties invoked need not be confined to the outermost surface of the molded product. Thus, I have made plastic products suitable for reflector surfaces to be used on highway signs to be illuminated by automobile headlights which depend on sub-surface, internal optical properties. According to one method, I select relatively large granules of a colorless transparent plastic and apply bright metallic coatings to the plastic granules; after molding, I polish off the outermost metal skin and polish up the plastic so as to reveal a multi-faceted mirrored background (primarily underneath the plastic exterior and protected by it). Similarly, very thin, transparent metal coatings may be employed with transparent plastic particles to secure full transparency and one-way mirror effects by means of illumination from behind.

The present application is a continuation-inpart of my prior application Serial No. 735,553, filed March 18, 1947, now abandoned.

Since many other embodiments of the invention can be readily visualized without departing from its spirit or scope, it is intended that all matter contained in the foregoing description shall be interpreted as illustrative and the claims shall not be read in any restrictive sense other than that imposed by the limitations recited within the claims.

I claim:

1. The method of making a conductive plastic molded product which consists essentially of tumbling together a comminuted organic molding plastic and from 5% to 15% on the weight of the plastic of a metal powder having laminar particles with an average diameter less than one-third the diameter of the plastic particles, continuing the tumbling until at least 90% of the surface area of the plastic is covered with metal, and then molding the resulting metal-clad particles to form a plastic body free from voids wherein the metal forms a reticulated structure extending continuously throughout said body.

2. The method of producing a molding powder adapted to be used in molding conductive plastic articles which consists essentially of introducing into a tumbler a comminuted organic molding plastic and 5% to 15% on the weight of the plastic of a metal powder having laminar particles with an average diameter less than one-third the average diameter of the plastic particles, the aggregate volume of plastic and metal introduced being less than 40% of the volume of said tumbler, and rotating said tumbler until at least 90% of the surface area of the plastic is covered with metal.

3. The method of producing a molding powder adapted to be used in molding conductive plastic articles which consists essentially of tumbling together a comminuted organic molding plastic and 5% to 15% on the weight of the plastic of a metal powder having laminar particles with an average diameter less than one-third the average diameter of the plastic particles, and continuing the tumbling until at least 90% of the surface area of the plastic is covered with metal, and then screening the tumbled product to remove excess metal therefrom.

4. The method of producing a molding powder adapted to be used in molding conductive plastic articles which consists essentially of tumbling together a comminuted organic molding plastic and 1% to 30% on the weight of the plastic of a metal powder having laminar particles with an average diameter less than one-third the average diameter of the plastic particles, and continuing the tumbling until at least 90% of the surface area of the plastic is covered with metal.

5. A molding powder adapted for molding metallized plastic articles, which comprises an organic molding plastic in comminuted form, the particles of said plastic being coated with a substantially continuous coating of metal, the amount of said metal satisfying the requirements that $R_A$ be in the range of about 0.90 to 1.00 and $R_V$ be in the range of about $5 \times 10^{-4}$ to $3 \times 10^{-2}$ where $$R_A = \frac{A_M}{A_P}$$

and $$V_V = \frac{V_M}{V_P + V_M}$$

$A_P$ being the surface area of said plastic, $A_M$ the surface area of said plastic covered with said metal, $V_P$ the volume of said plastic and $V_M$ the volume of said metal.

6. A molding powder adapted for molding conductive plastic articles, which comprises an organic molding plastic in comminuted form and about 1% to 30% of metal powder based on the weight of said plastic, the particles of said metal powder having an average particle size less than one-third the average particle size of the plastic particles, said metal being attached to the surfaces of the particles of said plastic and covering at least 90% of the surface area of said plastic particles.

7. A molding powder adapted for molding metallized plastic articles, which comprises an organic molding plastic in comminuted form and form 5% to 15% of metal powder, based on the weight of said plastic, the particles of said metal powder being laminar and having an average particle size less than one-third the average particle size of the plastic particles, said metal powder being disposed as a substantially uniform coating on the particles of said plastic and covering at least about 0.9 of the surface area of said particles.

8. The molding powder of claim 6 wherein the particulate plastic is polystyrene and the metal powder is flake silver.

9. The molding powder of claim 6 wherein the particulate plastic is polyvinyl chloride and the metal powder is flake silver.

10. The molding powder of claim 6 wherein the particulate plastic is a phenolic resin and the metal powder is flake silver.

11. The molding powder of claim 6 wherein the particulate plastic is a phenolic resin and the metal powder is a flake copper-nickel alloy.

12. The molding powder of claim 6 wherein the particulate plastic is a phenolic resin and the metal powder is a flake nickel-chromium alloy.

13. A conductive plastic product molded from the molding powder defined in claim 5.

14. A conductive plastic product molded from the molding powder defined in claim 6.

15. A conductive plastic product molded from the molding powder defined in claim 7.

16. A conductive plastic product molded from the molding powder defined in claim 8.

17. A conductive plastic product molded from the molding powder defined in claim 9.

18. A conductive plastic product molded from the molding powder defined in claim 10.

19. A conductive plastic product molded from the molding powder defined in claim 11.

20. A conductive plastic product molded from the molding powder defined in claim 12.

References Cited in the file of this patent

UNITED STATES PATENTS

| | | |
|---|---|---|
| 1,922,221 | Steenbeck | Aug. 15, 1933 |
| 2,044,608 | Harford | June 16, 1936 |
| 2,280,135 | Ward | Apr. 21, 1942 |
| 2,403,657 | Harvey | July 9, 1946 |
| 2,416,480 | Henry et al. | Feb. 25, 1947 |
| 2,421,154 | Maier | May 27, 1947 |
| 2,434,190 | Barnes et al. | Jan. 6, 1948 |
| 2,683,669 | Coler | July 13, 1954 |

FOREIGN PATENTS

| | | |
|---|---|---|
| 519,298 | Great Britain | Mar. 21, 1940 |